United States Patent [19]

Anderson et al.

[11] 4,382,728

[45] May 10, 1983

[54] WORKPIECE RETAINING PRESSURE-FOOT ASSEMBLY FOR ORTHOGONALLY MOVABLE MACHINE TOOL

[75] Inventors: Birger O. Anderson, Bellevue; David L. Wagner, Kent, both of Wash.

[73] Assignee: The Boeing Company, Seattle, Wash.

[21] Appl. No.: 88,018

[22] Filed: Oct. 25, 1979

[51] Int. Cl.³ .......................... B23C 1/06; B23Q 3/06; B23Q 11/02

[52] U.S. Cl. .............................. 409/137; 83/425 CC; 144/134 A; 408/88; 408/95; 409/178; 409/191; 409/202; 409/235; 409/903

[58] Field of Search ............... 409/137, 138, 141, 175, 409/178, 180, 190, 191, 189, 226, 227, 235, 903, 202, 212; 408/77, 95, 98, 88; 269/134, 135, 289 MR; 144/134 R, 134 A, 134 B, 134 C, 136 R, 252 R; 83/451, 925 CC

[56] References Cited

U.S. PATENT DOCUMENTS

| | | | |
|---|---|---|---|
| 2,546,957 | 3/1951 | Ray | 408/88 |
| 3,418,883 | 12/1968 | Leibow | 409/138 |
| 3,587,391 | 6/1971 | Pitts et al. | 409/235 |
| 3,877,833 | 4/1975 | Thornton et al. | 408/112 X |
| 4,158,987 | 6/1979 | Smith | 409/190 X |
| 4,212,570 | 7/1980 | Larsson | 408/95 |
| 4,251,174 | 2/1981 | Satler | 409/137 |

*Primary Examiner*—Z. R. Bilinsky
*Attorney, Agent, or Firm*—Christensen, O'Connor, Johnson & Kindness

[57] ABSTRACT

In a numerically controlled, gantry-type routing machine, a workpiece pressure-foot assembly is disposed crosswise over an elongate workpiece supporting bed for providing an effective hold-down force for stacked workpiece sheets. The hold-down force is applied to the workpiece stack at locations adjacent a router tool that is held and turned by a motor driven spindle assembly movably mounted on a gantry for orthogonally related lengthwise and crosswise movements with respect to the bed and workpiece. The pressure-foot assembly includes a pair of spaced parallel rails, pivotally supported about axes parallel to the rails, and a plurality of pressure-bearing rollers mounted on axes directly underlying each of the rails for supporting the rails, and accommodating travel of the assembly over the upper surface of the workpiece. The pair of rails and supporting rollers are arranged crosswise of the bed, paralleling the gantry, and underlying the spindle assembly. The opposed end portions of the pivoted rails are supportively connected to the adjacent sides of the gantry for movement with the gantry lengthwise of the bed. A gimbaled truck, including an associated chip pickup suction assembly, rides on the rails for travel crosswise of the bed, and is coupled to the spindle assembly by a fluid controlled actuator for exerting a downward pressure on the rails whenever the tool of the spindle assembly is moved into cutting engagement with the underlying workpiece. The rails and the pressure rollers are segmented along the rail length for independent vertical movement that enables downward pressure of the spindle assembly to be effectively transmitted via the truck, rails and pressure rollers to the workpiece stack in a localized area surrounding the tool for simultaneously routing of sheets in a numerically controlled two-dimensional pattern composed of successive or concurrent orthogonal movements of the spindle assembly.

17 Claims, 6 Drawing Figures

WORKPIECE RETAINING PRESSURE-FOOT ASSEMBLY FOR ORTHOGONALLY MOVABLE MACHINE TOOL

FIELD OF THE INVENTION AND BACKGROUND

The present invention relates to workpiece holddown devices for machines in which the machining tool is movable in a plane parallel to a workpiece consisting of a sheet or sheets of stock material, for machining the workpiece in a desired pattern by means of successive concurrent orthogonal tool movements.

While the principles of the invention can be used in a wide variety of applications in which there is a need to hold a workpiece in place while being machined, the embodiment of the invention that is disclosed herein is suited for retaining a stack of relatively thin workpieces, such as a stack of sheet metal, during simultaneous routing of the stack on a numerically controlled (N/C), gantry-type of router. For example, in the mass production of metal parts, it is often desirable to simultaneously cut a large number of relatively thin sheets into a desired two-dimensional pattern. For this purpose, a stack of ten or twenty relatively thin metal sheets may be laid on a router bed, and secured to the bed by such means as clamps, temporary hold-down bolts or screws. The sheet metal stack, once secured in this manner, is then machined by a router in which the routing tool penetrates the entire thickness of the stack, and is moved parallel to the upper surface of the stack, in a controlled fashion to simultaneously rout all of the sheets of the stack to the desired pattern.

The equipment usually employed for this kind of routing includes a broken-arm router and a preshaped template which is disposed as the top layer of the stack, and which serves to guide the spindle assembly and the associated routing tool to form the desired pattern. The template, in addition to controlling the outline of the part, also provides an effective means for retaining the stack of metal sheets in a clamped-up state. The template is laid on top of the stack of unformed metal sheets, and holes are drilled through the sheets at guide openings provided on the template. Then lag screws are mounted in these openings and tightened down into an underlying sheet of plywood that is affixed to the bed of the machine. The number and location of the lag screws are selected so that the layers of sheet metal are held together with such integrity that there is no opportunity for cutting chips, generated during the routing operation, to work their way in between the sheets adjacent the path of the cutting tool. The template, which is usually made of a thicker material than the individual sheets, and is thus more rigid, distributes the force exerted by the individual, hold-down lag screws, uniformly about the surface area of the stack so that adequate stack clamp-up is provided not only immediately adjacent the lag screws, but also at all locations between such screws. With such a clamp-up, any residual chips left on the stack cannot be permitted to get in between the sheets and damage the surface quality of the part.

The use of broken-arm routers and templates, has heretofore provided an effective technique for maintaining the surface quality of stack routed parts. Now, however, in an effort to reduce the overall cost per unit of stack-routed parts, operations previously performed on a broken-arm router are now being carried out on gantry-type, N/C routers. Such N/C routers eliminate the labor intensive template making and clamp-up procedure required with the former machines and offer the flexibility of being able to rout a variety of different parts from a stack of large sheet metal blanks, and to automatically determine the proper location and orientation of the various parts for maximum utilization of the available surface area of the blank stack. Once the particular part patterns are entered into the data processor of the numerical controlled machine, and after the processor has determined the most efficient location and orientation for the selected patterns, the router spindle assembly is driven, successively or concurrently, in orthogonally related directions over the upper surface of the sheet metal stack, causing the router tool to cut out the desired patterns.

While it will be appreciated that the N/C router offers significant advantages in terms of flexibility and efficient utilization of material, the elimination of the part control templates that are used on the broken-arm routers, results in the loss of a convenient and effective means of stack clamp-up needed to prevent surface damage to the parts caused by cut chips entering gaps between the sheets. A solution to this problem has not been readily found, and a number of unsuccessful efforts to overcome this difficulty were proposed and tried before realizing the principles of the present invention. One such prior, unsuccessful attempt was to provide a sliding pressure-foot that slid over the upper surface of the stack to accommodate the relative movement between the router spindle and the stack. However, for effective stack retention, so much downward pressure had to be exerted on the sliding foot that the upper surface of the top sheet was intolerably scratched. Additionally, the sliding pressure-foot, when subjected to the necessary hold-down pressure, was unable to ride up and over the heads of lag screws, a few of which are still needed on the N/C stack routing machine for holding the stack against shear, and at a fixed reference with respect to the machine bed. Similarly, an attempt to use air pressure bearings to exert the necessary downward force on the stack, while minimizing friction and associated surface abrasion, was unsuccessful because of the inability of the air bearings to negotiate the heads of the clamp-up lag screws. Also, air pressure loss was excessive because of escapement of air through the slots necessarily cut in the stack by the router tool.

Other proposed solutions to the stack clamp-up problem have included a process of submerging the metal sheets in water and freezing the submerged stack prior to machining; and a process of applying adhesive between the contacting surfaces of the sheets and letting the adhesive set up prior to routing. Both these processes proved too costly and significantly detracted from the other cost-effective benefits of numerically controlled routing.

Accordingly, one object of the invention to provide a workpiece hold-down apparatus for machines of the type characterized above, wherein the hold-down apparatus is effective in applying a compressive hold-down force on a stack of relatively thin workpiece sheets and for concentrating such hold-down force in a localized region immediately surrounding the machining tool to prevent chips generated by the machining operation from entering gaps between the individual sheets.

Another object of the invention is to provide a holddown apparatus for a workpiece consisting of a stack of metal sheets that are to be simultaneously routed to a predetermined two-dimensional pattern by a gantry-type router, in which a router spindle assembly is movable on and by a gantry in successive and/or concurrent orthogonal directions in a plane parallel to the stack of sheet metal.

Still another object of the invention is to provide a hold-down apparatus for machines in which the machining tool is moved in controlled patterns relative to the surface of sheet material by a numerically controlled processor so as to machine the material in a preselected pattern.

SUMMARY OF THE INVENTION

The principles of the invention are embodied in a workpiece retaining pressure-foot assembly mounted on a machine of the type having a generally flat workpiece supporting bed and a machining tool that is movable in a plane parallel to the bed along successive and/or concurrently traveled, and orthogonally related directions for machining a workpiece according to a desired pattern. For this purpose, the pressure-foot apparatus briefly comprises at least one rail arranged in overlying relationship to the machine bed, and at least one set of pressure-exerting rollers having an axis extending parallel to and generally beneath the rail. Together the rail and pressure rollers are mounted on the machine for floating movement normal to the bed so that when a relatively flat workpiece is disposed on the bed, the rail and pressure roller assembly can be brought down into operative position with the pressure rollers bearing against the upper surface of the workpiece. The pressure rollers are orientated so as to accommodate movement of the rail (and machining tool) relative to the workpiece in a direction transverse to the rail. To apply downward pressure on the workpiece, via the rail and pressure roller unit during machining, a truck is mounted for travel along the rail and is coupled to the machine tool drive, which for example may be a motor driven spindle assembly. The truck and tool drive are movable as a unit away from and toward the machine bed and also as a unit, along the rail and thus in a direction orthogonal to the above-mentioned relative movement between the workpiece and tool. As the tool drive is moved toward the bed to position the tool for machining the workpiece, the truck is forced down against the rail. Reactively, the pressure rollers transmit this downward force unto the upper surface of the workpiece, compressively retaining the workpiece against the supporting bed.

In a preferred form of the invention, a pair of spaced-parallel rails are employed, each having a set of pressure rollers mounted there beneath and riding on the upper surface of the workpiece. In such case, the truck is gimbled and provided with a set of four wheels positioned so that two of the wheels ride on one rail and the other two wheels on the opposite rail with the body of the truck straddling the pair of rails and having a centered opening for allowing a machine tool, held by an overhead tool drive, to pass downwardly therethrough and engage the underlying workpiece.

Also in the preferred form of the invention, the rails and underlying pressure rollers and associated axes are segmented, along the lengths of the rails, so that only those rail segments and associated pressure rollers that underlie the truck wheels at any given time, are forced downwardly against the workpiece. Thus, the workpiece retention force is more effectively localized to the area of the workpiece that immediately surrounds the tool.

Further in accordance with the preferred form of the invention, the workpiece retaining pressure foot apparatus is mounted on a gantry-type router, in which a router-held spindle assembly is mounted on a gantry that straddles an elongate, horizontal workpiece supporting bed. The spindle assembly is movably mounted relative to the gantry for crosswise travel with respect to the bed to provide one orthogonal axis of movement of the router tool, and the gantry itself is movable lengthwise of the bed to provide the other orthogonal axis of movement of the spindle assembly and router tool. A workpiece, such as a stack of relatively thin sheet metal blanks, is disposed on the router bed and secured against any shear movement in the plane of the bed. The rail and pressure roller assembly is then lowered onto the upper surface of the top workpiece sheet, so that as the gantry moves lengthwise of the bed, the pressure rollers are aligned for rolling in the lengthwise direction over the workpiece surface. The router spindle is then lowered into place so that the router tool penetrates the stack of sheets, such as enabled by a predrilled entry hole. Concurrently, the pressure-exerting truck is forced by the downward movement of the spindle assembly, down onto the pair of rails, which in turn transmits the downward force through the pressure rollers onto the top sheet of the stack of sheet metal. As the router is controllably moved in a plane parallel to the bed in successive or concurrent lengthwise/crosswise movements relative to the workpiece, the pressure rollers and truck wheels provide the needed degrees of freedom for enabling the pressure-foot apparatus to follow the router movement. Maximum compressive force is thus always maintained on the workpiece in an area surrounding the router tool, to prevent the sheets from delaminating in the vicinity of the cutting operation and thus to prevent entry of cutting chips between the separated edges of the sheets.

Additionally, in the preferred embodiment, a suction pickup assembly is structurally integrated with the truck, for providing a chip-entry hood which surrounds the router tool and projects downwardly between the spaced rails and associated pressure rollers so that the mouth of the entry hood is near but does not contact the upper surface of the workpiece for maximum chip pickup efficiently.

To provide a complete disclosure of the invention, reference is made to the appended drawings and following description of one particular and preferred embodiment.

DETAILED DESCRIPTION

Figure 1:
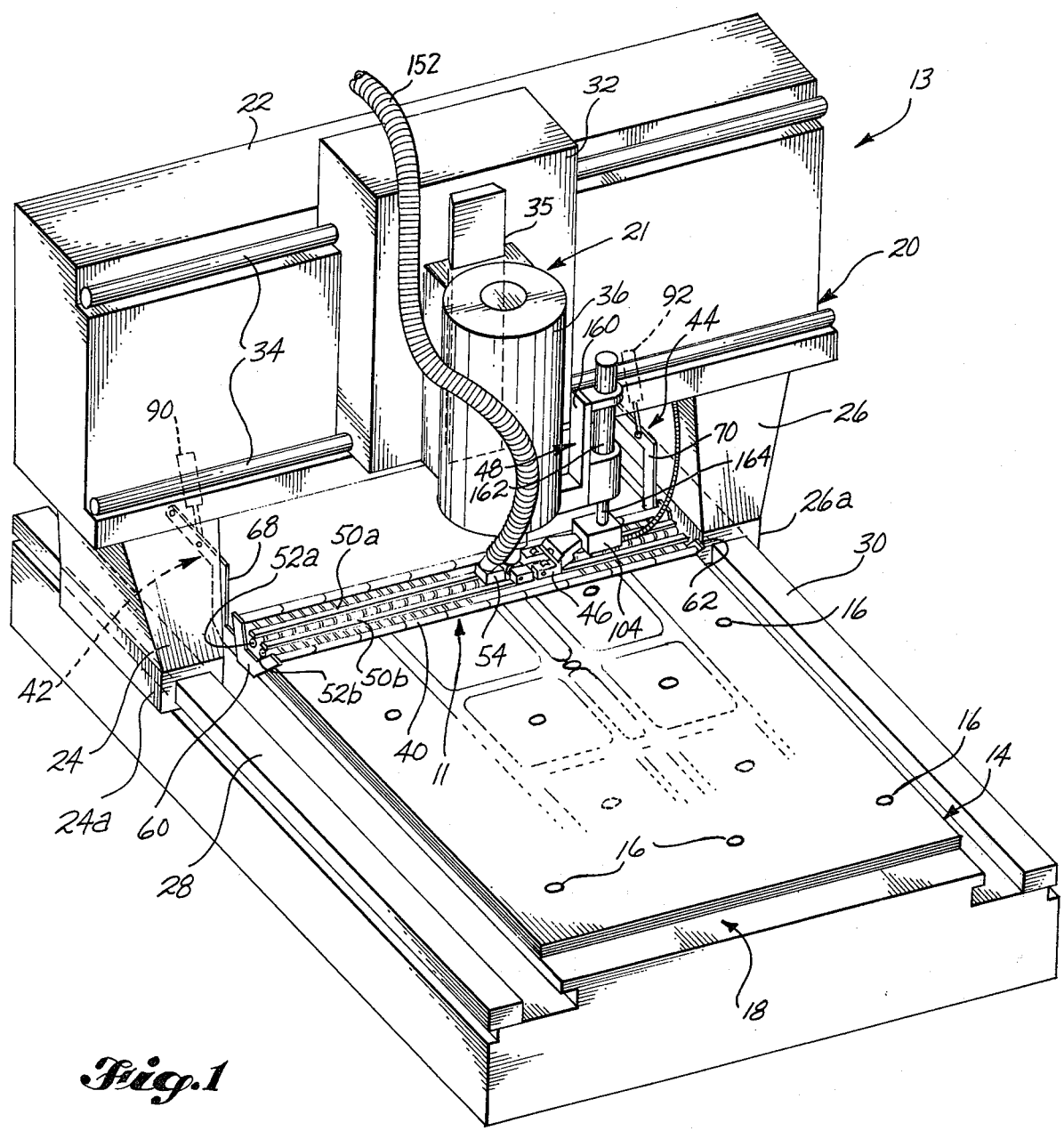
FIG. 1 is an isometric view of the workpiece retaining pressure-foot apparatus combined with a gantry mounted router that is orthogonally movable in a plane parallel to the underlying workpiece supporting bed.

With reference to FIG. 1, a workpiece retaining pressure-foot assembly 11, constructed in accordance with a currently preferred embodiment of the invention, is shown in place on a gantry-type router 13. While assembly 11 has general utility for retaining thin, flat workpieces, it is particularly effective in holding down a stack 14 of sheet material, such as sheet metal, that is to be simultaneously routed by a cutting tool held by a vertically-oriented spindle 36 of router 13. In such case, pressure-foot assembly 11 compressively clamps down on stack 14 in a localized region surrounding the cutting tool to prevent cutting chips from working in between the layers of stack 14, as chips are generated along the path of the cut.

The advantages of pressure-foot assembly 11 are especially realized in conjunction with a router 13 that is numerically controlled (N/C). In an N/C router 13 of the gantry-type, only minimal clamp-up is required for stack 14 because of the elimination of the need for an overlying template guide. Adequate clamp-up is achieved by a few, suitably located wood screws 16 of a type having rounded heads which are visible in FIG. 1 that secure stack 14 to a plywood-surfaced bed 18 of a router 13, and resist shear movement of stack 14 relative to bed 18. Screws 16 also hold the individual parts in place, once they are cutout of the larger sheets.

With a stack 14 of blank sheet material secured by screws 16 to router bed 18, a tool-holding spindle assembly 21 is moved on and by a gantry 20 in a plane parallel to bed 18 in successive and/or concurrent lengthwise and crosswise motions to simultaneous rout the desired part pattern from the multiple sheets of stack 14. During routing pressure-foot 11 maintains the needed compressive force on stack 14, adjacent the router tool, so as to prevent delamination of the stack along the cut which would (if it occurred) allow entry of the cutting chips between the layers of sheet material. As explained more fully hereinafter, the few number of screws 16 serves only to prevent shifting of stack 14 in shear and to hold cutout parts in place, and does not provide adequate stack retention in compression for preventing cutting chips from working in between the sheets of material.

Now more particularly, router 13 includes a gantry 20 having an elevated, cross-body 22 that is supported at its opposite ends on downwardly depending legs 24 and 26. The lower ends of legs 24 and 26 are provided with shoes 24a and 26a constructed to ride on spaced, parallel guides 28 and 30 that extend along opposite sides of bed 18. Usually and in this disclosed embodiment, bed 18 has its greatest or lengthwise dimension oriented parallel to the travel of gantry 20 and thus parallel to guides 28 and 30, so that gantry 20 straddles the width dimension of bed 18. The movement of gantry 20 lengthwise of bed 18 constitutes one axis of control of the N/C governed spindle movement of router 13. Rack and pinion drives (not shown) are cooperatively mounted between shoe 24a and guide 28, and between shoe 26a and guide 30, for driving gantry 20, with precision indexing, along the length of bed 18.

To provide the other axis of control gantry 20 supports a spindle carriage 32 that is movably mounted on guides 34 which accommodate travel of carriage 32 along cross-body 22 and thus crosswise to the underlying bed 18. Spindle assembly 21 includes a vertically-oriented rack and pinion drive 35 that mounts a tool-holding motorized spindle 36 to carriage 32 for controlled vertical reciprocation of spindle 36 relative to bed 18 and thus relative to stack 14. Another precision drive mechanism (not shown) is cooperatively mounted between carriage 32 and cross-body 22 for indexed movement of carriage 32 along the gantry body 22 in accordance with the numerically controlled operation of router 13, thus providing the other axis of control over the positioning of spindle assembly 21. By successive and/or concurrent lengthwise and crosswise movements of spindle assembly 21 when the routing tool held by spindle 36 has been moved downwardly by drive 35 into engagement with stack 14, the programmed part pattern or patterns are automatically cut from stack 14. During the movement of spindle 36 relative to bed 18, pressure-foot assembly 11 provides the needed, continuous compressive stack retention force in the localized area surrounding the router tool so that cutting chips do not work their way between the layers of sheet material.

For this purpose, pressure-foot assembly 11 includes an elongate rail/roller unit 40 disposed crosswise of bed 18 and connected at the laterally opposed ends to pneumatically actuated, pivot arm assemblies 42 and 44 that retract and deploy unit 40 and hold it in floating relationship to the upper surface of workpiece stack 14. A gimbaled, multi-wheel truck 46 is coupled to spindle 36 by a vertically reciprocating pneumatic actuator 48. The wheels of truck 46 ride on a pair of spaced-parallel rails 50a and 50b of unit 40 for applying a downward workpiece retention force to the upper sheet of stack 14 via spaced-parallel sets of pressure rollers 52a and 52b of unit 40 which underlie rails 50a and 50b, respectively. A chip pickup suction 54 including a suction hose 152 is structurally integrated with truck 46 for withdrawing most of the cutting chips as they are produced by a routing tool held at the lower end of spindle 36. Rail/roller unit 40 is connected to legs 24 and 26 by pivot arm assemblies 42 and 44, respectively, and truck 46 is connected to spindle assembly 21 by means of actuator 48 so that truck 46 moves in concert with spindle 36 relative to bed 18 and workpiece stack 14. During lengthwise movement, gantry 20 and all of the components connected thereto including spindle assembly 21 and rail/roller unit 40 of assembly 11 travel together along bed 18. Crosswise motion, which may occur independently or concurrently with lengthwise travel, is effected by movement of spindle assembly 21 crosswise along body 22 of gantry 20 and the dependent movement therewith of actuator 48, truck 46 and suction 54. In such case, the wheels of truck 46 ride crosswise of bed 18 along rails 50a and 50b of unit 40 so as to maintain truck 46 in registration with spindle 36.

Rail/roller unit 40 is formed by a pair of roughly V-shaped end brackets 60 and 62 that are supportively connected to the opposed ends of a pair of spaced-parallel shafts 64a and 64b (FIG. 4) by end fastener screws 66. Brackets 60 and 62 are in turn mounted to the lower legs of L-shaped, offset members 68 and 70 by fasteners 74 (FIG. 4), and which members 68 and 70 constitute components of the pivoted arm assemblies 42 and 44.

Figure 2:
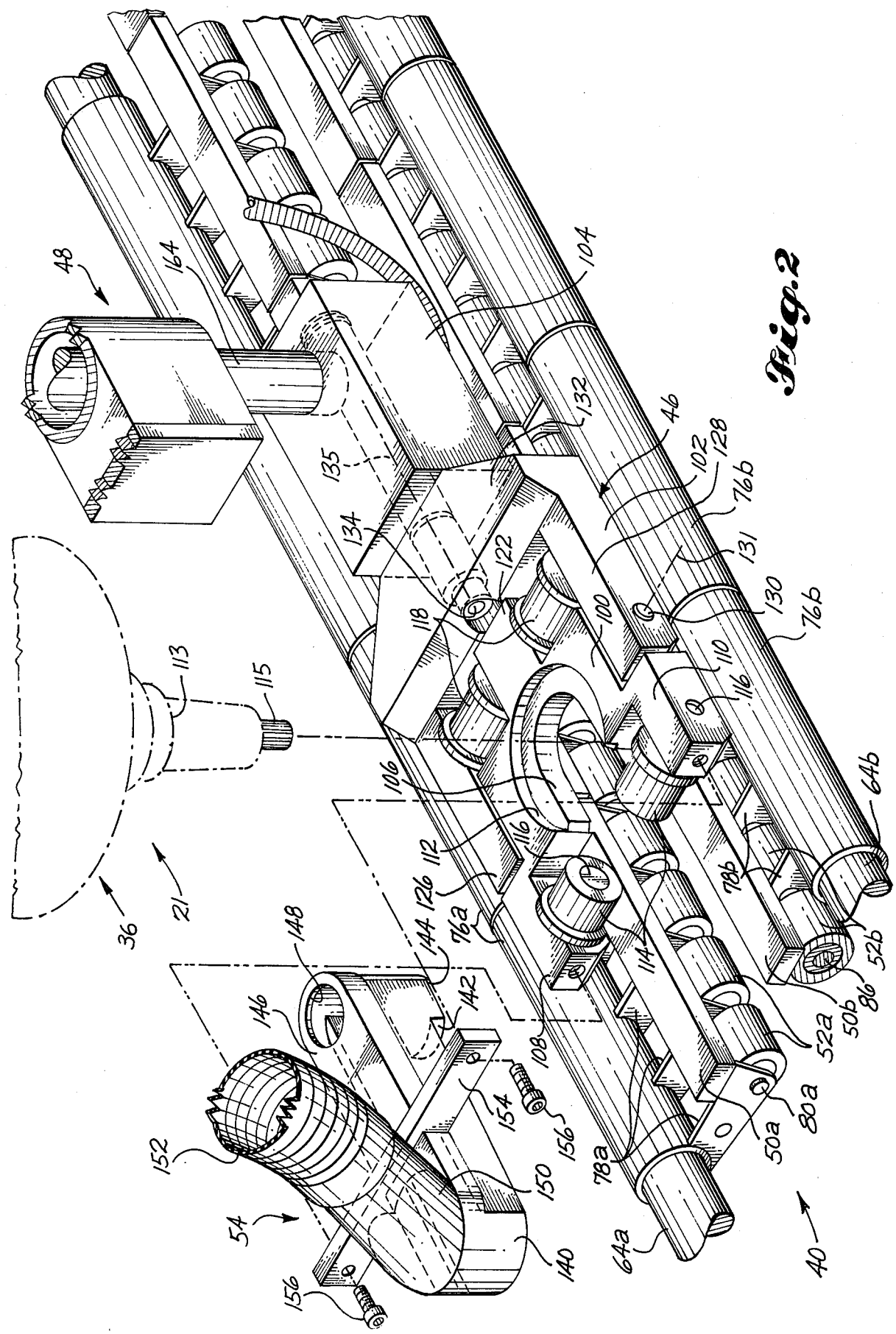
FIG. 2 is a fragmentary, exploded view, in isometric, of the pressure-foot assembly of FIG. 1.

With reference to FIG. 2, each of shafts 64a and 64b of unit 40 are fitted with a plurality of sleeve segments 76a (on shaft 64a) and 76b (on shaft 64b). The various segments 76a and 76b are rotatable independently of one another relative to the fixedly-mounted shafts 64a and 64b. The plurality of sleeve segments 76a on shaft 64a are in turn formed with a ganged set of longitudinal spaced and laterally outwardly projecting rail and roller support arms 78a. A roller axis pin 80a extends through the ganged arms 78a adjacent the lower, outboard ends of arms 78a, and individual rollers of segmented rollers 52a are journaled on pin 80a, each roller being disposed between a pair of adjacent arms 78a. Overlying rollers 52a and axis pin 80a, is one complete segment of segmented rail 50a which is fixedly secured to the upper edges of arm 78a adjacent their outboard ends. Similarly each of the remaining sleeve segments 76a has a separate set of ganged support arms 78a, a rail segment 50a and associated, underlying support rollers 52a. Each sleeve segment 76a and the associated, attached rail segment and pressure roller support arms 78a are rotatable on shaft 64a independently of the other segments, support arms, rail segments and pressure rollers.

Similarily on the opposite side of unit 40, sleeve segments 76b are rotatably mounted on shaft 64b and are each formed with a separate set of ganged rail and roller support arms 78b to which a separate segment of rail 50b is affixed, as are individual rollers of segmented rollers 52b. When unit 40 is brought down onto stack 14, sleeve segments 76a and 76b are rotated so that the rail and roller support arms 78a and 78b project toward each other in a generally horizontal plane. Dependently, rails 50a and 50b and the associated support rollers 52a and 52b, are positioned in spaced apart parallelism defining an interrail gap for accommodating the router tool and chip pickup suction hood in a manner described more fully below. Also, the individual rollers of support rollers 52a are offset or staggered relative to rollers 52b along the length of unit 40 so as to distribute the clamping pressure more effectively about the routing point.

Figure 4:
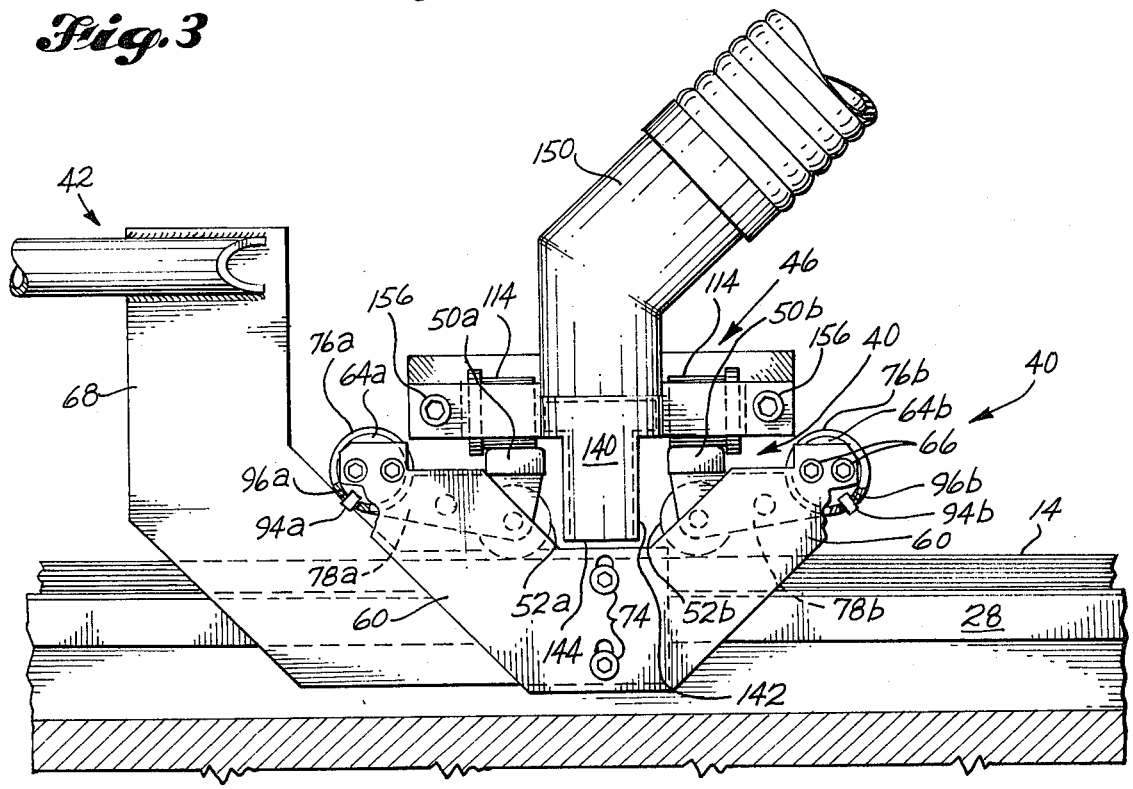
FIG. 4 is an end view of the pressure-foot assembly as would be viewed from the left hand side of FIG. 3.

To locate and secure workpiece stack 14 on bed 18, roller/rail assembly 40 is raised by operating pneumatic actuators 90 and 92, causing pivot arms 42 and 44 to pivot upwardly and rearwardly as viewed in FIG. 1, thereby lifting end brackets 60 and 62 and hence rail/roller assembly 40 upwardly off of workpiece 14. As seen in FIG. 4, each of sleeve-supporting shafts 64a and 64b are fitted with keys 94a and 94b for cooperating with lengthwise extending slots 96a and 96b in sleeve segments 76a and 76b. Keys 94a, 94b and the cooperating sleeve slots 96a and 96b, which are oversized relative to the corresponding dimension of keys 94a and 94b, limit the amount of permissible rotation of sleeve segment 76a and 76b about shafts 64a and 64b to a small arc. When the rail/roller unit 40 is deployed as shown in FIG. 4, the above-noted limited rotation allows rails 50a, 50b and the associated pressure rollers 52a and 52b to ride on stack 14, holding shafts 64a, 64b and sleeves 76a, 76b off of the upper surface of the stack 14. When unit 40 is raised by pivot arm assemblies 42 and 44 (see FIG. 1), the rotation limiting function of keys 94a and 94b maintain the rail and roller support arms 78a and 78b in a generally coplanar orientation so that they are in a proper position for subsequent deployment onto stack 14, and so that unit 40 can accommodate different thicknesses of stack 14.

Figure 5:
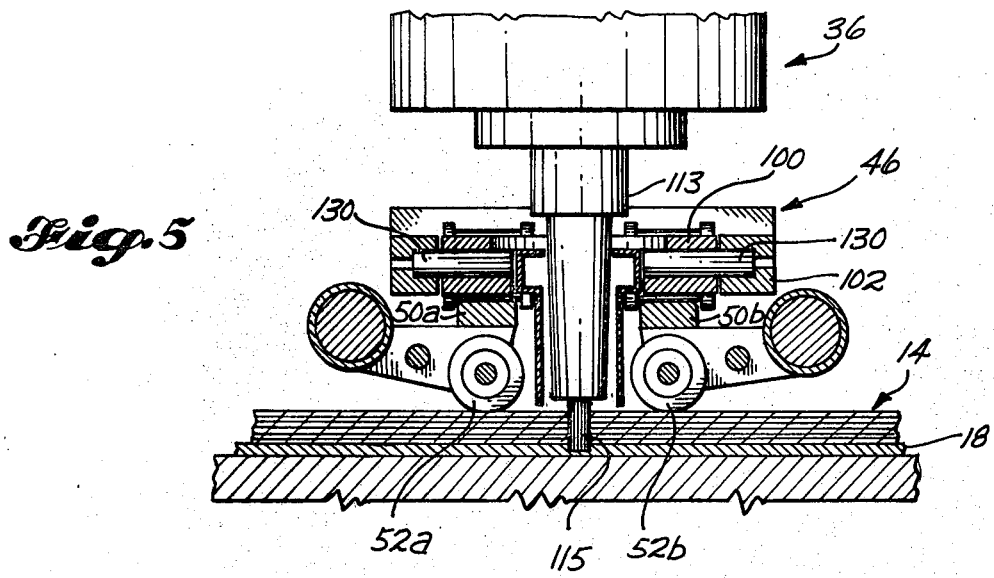
FIG. 5 is a vertical, sectional view taken along the plane indicated by line 55 in FIG. 3.

With reference to FIG. 2, truck 46 includes a generally Y-shaped body member 100, a bifurcated gimbal support 102 and a right-angle gimbal support block 104. The latter connects truck 46 to the elevated pneumatic actuator 48 (FIG. 1). Body member 100 is formed with a centralized, generally U-shaped cutout 106 which opens into the free space between the legs 108 and 110 of the Y-configuration. U-shaped cutout 106 is sized to accommodate a hood of the vacuum pickup assembly 54 in a manner more fully described below. Concentric with the radius center of cutout 106 is a circular countersink 112 that provides clearance for a chuck 113 that holds router tool 115 of spindle assembly 21 (FIG. 5).

Truck body member 100 carries a set of four, flanged wheels including a first set of wheels 114 journaled for rotation on axially-aligned studs 116 that project inwardly from the confronting inside surfaces of legs 108 and 110. The flanges have been removed from the inboard ends of rollers 114 and the ends of these rollers are coterminus with the inboard edges of rails 50a and 50b to provide a sufficient gap between these components to accommodate the hood of section pickup assembly 54.

A second set of flanged wheels 118 are journaled for rotation on opposed ends of a pin 120 (see FIG. 3) that is mounted in a stem portion 122 of the Y-shaped body member 100 and that projects outwardly from opposite side surfaces of portion 122. The thusly journaled rollers 118 turn on an axis parallel to the aligned axis of rollers 114 and spaced therefrom along the lengthwise dimension of rails 50a and 50b. The set of wheels 118 are formed with flanges at both ends of each wheel for straddling rails 50a and 50b and thus providing lateral guidance of truck 46 relative to the rail/roller unit 40.

Gimbal support 102 has bifurcated legs 126 and 128 which straddle the set of wheels 118 and the midbody portion of truck member 100. A pair of axially-aligned and laterally separated pivot pins 130 (FIG. 3) respectively interconnect legs 126 and 128 with the midbody portion of member 100 thereby defining a first gimbal axis 131 that lies parallel to and is substantially midway between the axes of wheels 114 and 118, and passes through the center of radius of cutout 106 and the center of circular countersink 112. The pivot axis 131 allows member 100 to rock about an axis lying transverse to rails 50a and 50b, midway between the spacing of wheels 114 and 118 along the direction of their travel. The inter-axle spacing between wheels 114 and 118 along the length of unit 40 is less than the length of the segments of rails 50a and 50b so that the segment or segments of unit 40 closest to the spindle are forced down against the workpiece stack 14.

Bifurcated legs 126 and 128 of gimbal support 102 merge into a connective portion 132 that is pivotally connected to support block 104 by an elongate pivot pin 134 which extends parallel to and above the level of rails 50a and 50b and at a location midway between rails 40a and 50b. Pin 134 thus provides a second gimbal axis 135, orthogonal to gimbal axis 131.

With further reference to FIG. 2, suction assembly 54 includes an elongate, substantially enclosed suction hood 140 of roughly T-shaped cross-section as best shown in FIG. 4. Adjacent one end, hood 140 is formed with a downwardly projecting, roughly cylindrically-shaped entry portion 142 that is open at the lower end to form a chip-entry opening 144. A top wall 146 of hood 140 is provided with a circular aperture 148 concentric with an overlying entry portion 142 for receiving the routing tool and tool-holding chuck of spindle 21. Aperture 148 is sized so as to form a partial air seal with the chuck of spindle 21 by a noncontacting but close tolerence fit therebetween. At the opposite end of hood 140, an upwardly inclined tubular connective portion 150 is arranged for connection to a flexible, corrugated suction hose 152. A suction source (not shown), is connected to hose 152 for creating a subatmospheric air pressure inside of hood 140 that causes air and cutting chips to be drawn up and through the entry opening 144. A crossbar-mounting bracket 154 is affixed to hood 140 at the upper wall 146, with opposed ends of bracket 154 projecting beyond the width of hood 140.

Figure 3:
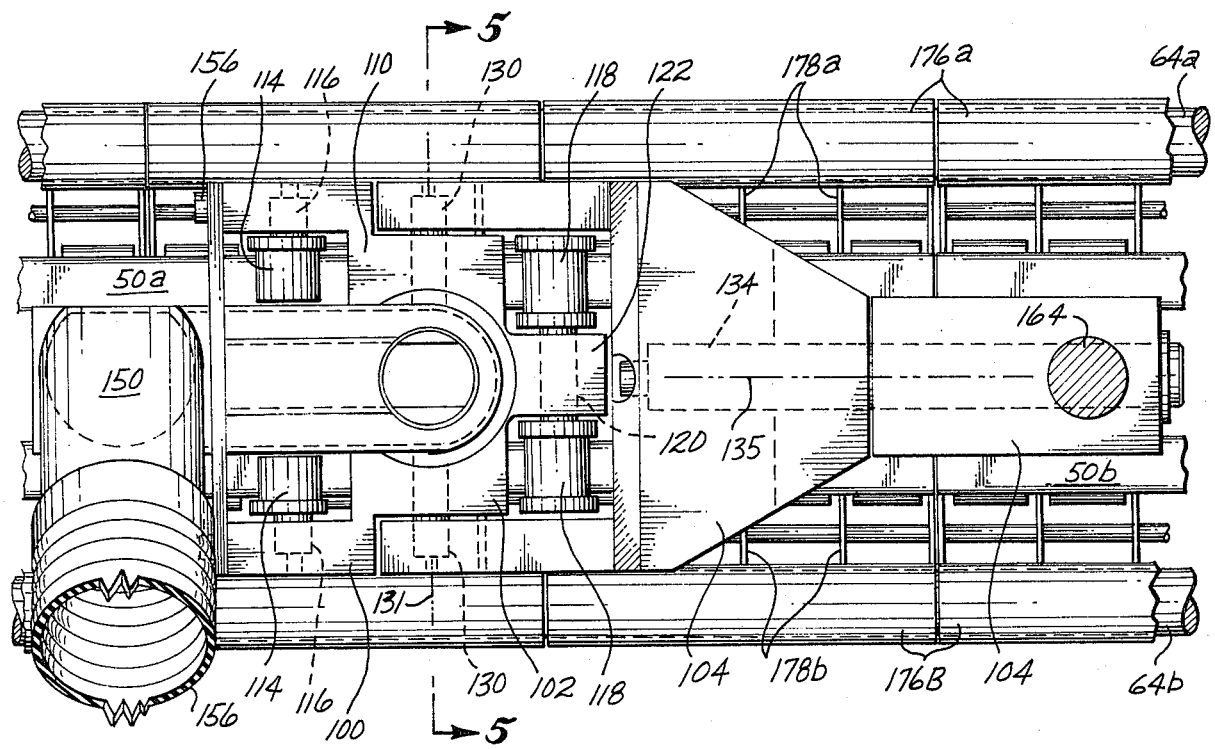
FIG. 3 is a top plan view of the pressure-foot assembly of FIGS. 1 and 2.

When hood 140 is assembled with truck assembly 40 as shown in FIGS. 3 and 4, the entry opening end of hood 140 is nested in cutout 106 of the midbody portion of member 100 with the upper wall 146 of hood 140 generally flush with the bottom of countersink 112. In this position, bracket 154 is affixed by fasteners 156 to the ends of truck legs 108 and 110. As illustrated in FIG. 4, the upper portion of the transversely T-shaped configuration of hood 140 has a width that fits, with suitable clearance between the confronting ends of wheels 114. The lower vertical portion of hood 140 projects downwardly between rails 50a, 50b and pressure rollers 52a, 52b, with even greater clearance relative to these latter components, so that hood 140 does not rub on rollers 52a, 52b during travel of truck 46. Entry opening 144 formed at the lower end of cylindrical portion 142 of hood 140 is located in elevation just slightly higher than the lower most portions of pressure rollers 52a, 52b so as to clear stack 14, and yet be close enough to the upper surface of the stack so that the subatmospheric suction created in hood 140 is capable of drawing cutting chips up into opening 144. The T-shaped cross-section of hood 140 allows the lower vertical portion of hood 140 to be sufficiently narrow to fit with adequate clearance in the limited width between rails 50a, 50b and rollers 52a, 52b, while the upper and wider portion of the T cross-section is capable of accommodating a relatively large volumetric rate of air flow between portion 150 at which suction hose 152 is connected and the chip entry opening 144, for providing sufficient chip pick-up suction.

Figure 6:
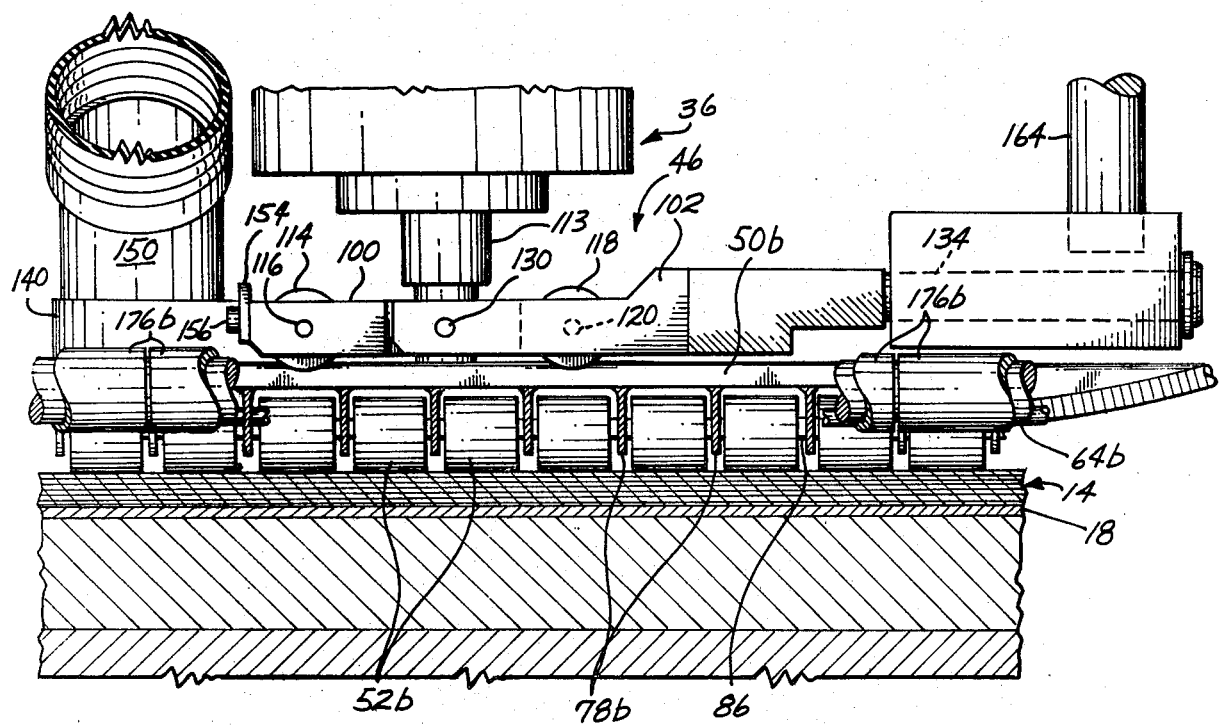
FIG. 6 is an affront elevation view of a truck component of the pressure-foot assembly of FIGS. 1-5.

As illustrated in FIG. 1, actuator 48 for truck 46 is supportively mounted on and in juxtaposition with spindle 36 by a bracket 160 such that actuator 48 moves up and down jointly with spindle 36 when the latter is vertically reciprocated by rack and pinion drive 35. Mounted in turn on bracket 160, is a pneumatic piston and cylinder assembly 162, oriented for vertical reciprocation parallel to the vertical axis of spindle 21. Assembly 162 controllably drives a piston rod 164 (see also FIGS. 2, 3 and 6) that has a splined extension (not shown) for controllably displacing support block 104 in elevation while restraining block 104 against rotation in the horizontal plane to maintain truck 46 aligned with rail/roller unit 40. The controlled independent movement of truck 46 with respect to spindle 36, enables actuator 48 to apply a pneumatically controlled downward pressure on truck 46 and hence onto rails 50a and 50b of unit 40, that is independent of the physical positioning of spindle 36 and the cutting tool held thereby relative to unit 40 and workpiece stack 14.

OPERATION

In the use and operation of router 13 and pressure-foot assembly 11, stack 14 is prepared for routing by the following setup procedure. Gantry 20 is driven to one end of bed 18, and rail/roller unit 40 is retracted upwardly with respect to bed 18 by pneumatically actuated pivot arm assemblies 42 and 44. The plywood-surfaced bed 18 is now accessible for receiving stack 14, which for example may be a plurality of relatively thin metal sheets. The plywood of bed 18 is rigidly held with respect to the side rails 28 and 30 of router 13, and the stack 14 is arranged on bed 18 and temporarily held in place by a relatively few screws 16 placed in predrilled holes, located for example adjacent the four corners of the rectangular stack 14. The location and number of additional holding screws is determined by a preprogrammed operation of the numerically controlled router 13, and holes for these additional screws are automatically drilled by a separate spindle assembly (not shown) mounted on carriage 32 and dedicated to a hole drilling operation. Once the additional set of holes are drilled, the additional screws 16, having low profile, rounded heads, are manually inserted to securely fasten stack 14 to plywood bed 18. The number and placement of the screws 16 are selected solely for the purpose of securing stack 14 against horizontal shear, and such screws are inadequate to prevent delamination of the stack sheets, a phenomenon that as described above will result in unacceptable scratching and galling of the surfaces of the individual sheets. Rather than relying on screws 16 for adequate hold down, pressure-foot assembly 11 is employed.

After the stack 14 has been set up as described above, actuators 90 and 92 are operated to lower rail/roller unit 40 down onto the upper surface of stack 14. Thus far, spindle 36 and the truck actuator 48 mounted thereto, have been held in an elevated position by rack and pinion drive 35 to accommodate the pivotal movement of rail/roller unit 40 between the retracted and deployed positions. Once unit 40 has been lowered onto stack 14, drive 35 is operated to lower spindle 36 and the actuator 48 affixed thereto downwardly into operative position as shown in FIG. 5. Spindle 36 has been located relative to bed 18 so that router tool 115 enters a starting hole that has been predrilled in stack 14 at the time that the holes are drilled for the clamping screws. During movement of spindle 36 into operative position, pneumatic actuator 48 applies a constant pneumatically governed downward pressure on 46 by means of a piston-cylinder assembly 162, and it is this pneumatically controlled pressure that determines the clamp down force on stack 14 transmitted by rails 50a and 50b and pressure rollers 52a and 52b that contact the upper surface of stack 14. Thus when spindle 36 has been lowered to position cutter tool 115 at a fixed elevation relative to stack 14 and bed 18 (see FIG. 5), the truck 46 floats relative to spindle 36, chuck 113 and tool 115, under a continuous and constant downward pneumatic pressure effected by actuator 48.

With further reference to FIG. 5, since pressure rollers 52a and 52b are closely spaced on either side of chuck 113 and tool 115, downward pressure applied to rails 50a and 50b by gimbaled truck 46 effectively holds the stack of sheet metal parts from separating along the cutting path of tool 115 while suction hood 140 continuously cleans the cutting area of metal chips. The segmentation of rails 50a, 50b and pressure rollers 52a and 52b, as well as the gimbaled structure of truck 46, insures that the pneumatically controlled downward pressure exerted on truck 46 by actuator 48 is effectively applied to stack 14 in a localized area surrounding chuck 113 and tool 115.

The programmed, numerically controlled operation of gantry 13 causes spindle 36 and the tool held thereby to travel in successive or concurrent orthogonal paths lengthwise and crosswise of bed 18 to cut from stack 14 and the individual sheets thereof, the predetermined workpiece patterns. As pressure-foot assembly 11 rides over stack 14 in lengthwise relationship to bed 18, rollers 52a and 52b ride relatively freely over the rounded, low profile heads of the few number of required clamping screws 16. As mentioned above, screws 16 merely serve to restrain stack 14 from any shear movement in the horizontal plane, while pressure-foot assembly 11 provides the crucial downward clamping force in an area localized around the cutting tool in order to prevent chips from working their way in between the sheets of stack 14 along the path of the cut.

While only a particular and presently preferred embodiment of the invention has been disclosed herein, it will be readily apparent to persons skilled in the art that numerous changes and modifications can be made thereto, including the use of equivalent means, devices and method steps, without departing from the spirit of the invention. For example, while the actuator 48 of the embodiment disclosed herein moves along a vertical axis that is parallel to and offset with respect to the axis of rotation of spindle 21, it will be appreciated that an alternative embodiment can provide an actuating mechanism for truck 46 that is coaxial with spindle 21. In such case, the actuator could be provided by hollow, telescopically cooperating cylinders that surrond the tool holding chuck 113, with a lower extendable end connected by orthogonal gimbal axis to truck 46.

The embodiments of the invention in which an exclusive property or privilege is claimed are defined as follows:

1. In combination with a machine having a cutter means movable toward and away from and parallel to a flat workpiece support surface, an improved workpiece hold-down apparatus for holding a workpiece of substantially uniform thickness against said support surface in proximity to said cutter means, comprising:
   a rail means disposed parallel to the plane of said support surface;
   elongated pressure-transmitting roller means coextensive with said rail means and disposed between said rail means and said support surface for riding over the adjacent surface of a workpiece laid against said support surface and for cooperating with said rail means for transmitting a force applied to said rail means in a direction normal to said support surface onto said workpiece, said roller means being oriented for accommodating movement of said rail means relative to said support surface, and to a workpiece laid thereagainst, in a direction transverse to said rail means, wherein said rail means and said roller means are segmented along their lengthwise dimension to form associated rail and roller segments that are independently movable in said direction normal to said support surface;
   truck means mounted for travel along said rail means; and,
   coupling means associated with said cutter means for coupling said truck means with said cutter means for cojoint movement thereof relative to said rail means and the underlying workpiece support surface, said coupling means including means for urging said truck means against said rail means in a direction oriented toward said workpiece surface, said rail and roller segments coacting with said truck means so as to apply a workpiece retaining pressure that is directed normal to said support surface and is localized to an area of a workpiece proximate said cutter means.

2. In the combination set forth in claim 1, said machine further having means for restraining a workpiece against movement parallel to said support surface.

3. In the combination of claim 1 wherein said coupling means includes a fluid actuator means for applying a fluid regulated downward force on said truck means relative to said cutter means, which force is transmitted via said rail means and roller means to a workpiece retained against said workpiece support surface.

4. In the combination of claim 1, wherein said pressure-transmitting roller means has an axis of rotation extending parallel to said rail means and lying between said rail means and said workpiece support surface, said rail means being connected to said axis of said pressure-transmitting roller means such that a force applied by said truck means to a surface of said rail means remote from said workpiece support surface and in a direction normal to said workpiece support surface is transmitted by said rail means to said axis of said pressure-transmitting roller means and, hence, to a workpiece.

5. In combination with a machine having a cutter means movable toward and away from and parallel to a flat workpiece support surface, an improved workpiece hold-down apparatus for holding a workpiece of substantially uniform thickness against said support surface in proximity to said cutter means, comprising:
   a rail means disposed parallel to the plane of said support surface, said rail means including first and second spaced parallel rails;
   pressure-transmitting roller means disposed between said rail means and said support surface for riding over the adjacent surface of a workpiece laid against said support surface and for cooperating with said rail means for transmitting a force applied to said rail means in a direction normal to said support surface onto said workpiece, said pressure-transmitting roller means including first and second sets of pressure rollers mounted for rotation beneath said first and second rails respectively such that said first and second rails and said first and second sets of rollers form a free space therebetween for receiving said cutter means, said roller means being oriented for accommodating movement of said rail means relative to said support surface, and to a workpiece laid thereagainst, in a direction transverse to said rail mean;
   truck means mounted for travel along said rail means, said truck means including a truck having wheels that ride on said first and second rails and a body that straddles said first and second rails and overlies said free space therebetween; and
   coupling means associated with said cutter means for coupling said truck means with said cutter means for conjoint movement thereof relative to said rail means and the underlying workpiece support surface, said coupling means including means for urging said truck means against said rail means in a direction oriented toward said workpiece surface so as to apply a workpiece-retaining pressure that is directed normal to said support surface and that is transmitted by said roller means to a workpiece that is to be retained during cutting by said cutter means.

6. In the combination of claim 5, wherein said coupling means comprises gimbal means for connecting said truck to said cutter means so as to uniformly distribute a downward force on said truck to said plurality of truck wheels that ride on said first and second rails.

7. In the combination of claim 5 further comprising a pair of spaced parallel shafts arranged parallel to and on the outboard sides of said first and second rails and being supported at their ends so as to span said workpiece support surface, sleeve means mounted on said shafts for rotation relative thereto, and transversely oriented support arms connected between a first of said sleeve means and said first rail and associated first set of pressure rollers, and a second set of support arms connected between a second of said sleeve means and said second rail and associated second set of pressure rollers, whereby said first and second rails and respectively associated first and second sets of pressure rollers are held in said parallel orientation by said support shafts while said first and second sleeve means and first and second sets of support arms allow said rails and associated pressure rollers to pivot in a limited arc toward and away from said workpiece support surface.

8. In the combination of claim 7, wherein said first and second of said sleeve means, and said first and second rails and said first and second sets of pressure rollers are transversely segmented.

9. In the combination as set forth in claim 8, further comprising first and second end bracket means supportively connected to opposite ends of said shafts for supporting said shafts in fixed parallel relation with respect to said workpiece support surface, and actuator means for jointly raising and lowering said first and second bracket means relative to said support surface.

10. In the combination of claim 7, wherein said first and second sets of pressure rollers are staggered in the lengthwise direction of said rails.

11. In the combination of claim 5, further comprising a chip suction hood means mounted to said truck and having an entry opening that projects from said truck downwardly between said first and second rails and said first and second sets of pressure rollers toward said workpiece support surface and a workpiece laid there against.

12. In combination with a machine having a cutter means movable parallel to a flat workpiece support surface, an improved workpiece hold-down apparatus for holding a workpiece of substantially uniform thickness against said support surface in proximity to said cutter means, comprising:

rail means disposed parallel to the plane of said support surface;

pressure-transmitting roller means elongated along the axis of rotation and disposed parallel to and between said rail means and said support surface for riding over the adjacent surface of a workpiece laid against said support surface and for cooperating with said rail means for transmitting a force applied to said rail means in a direction normal to said support surface onto a workpiece held against said support surface, said rail means and said roller means being segmented along their lengths to form associated rail and roller segments that are independently movable in said direction normal to said surface;

truck means mounted for travel along said rail means so as to successively coact with said rail and roller segments; and, coupling means associated with said cutter means for coupling said truck means with said cutter means for conjoint movement thereof relative to said rail means and the underlying workpiece support surface, said coupling means including means for urging said truck means against said rail means in said direction normal to said workpiece support surface so as to cause those of said rail and roller segments coacting with said truck means to apply a workpiece-retaining pressure that is localized to an area of a workpiece proximate said cutter means.

13. In the combination set forth in claim 12, said machine further having means for restraining a workpiece against movement parallel to said support surface.

14. In the combination of claim 12, wherein said rail means comprises first and second spaced parallel and lengthwise segmented rails, and wherein said segmented pressure-transmitting roller means comprises first and second sets of segmented rollers mounted for rotation beneath said first and second segmented rails respectively such that said first and second segmented rails and said first and second sets of segmented rollers form a free space therebetween for receiving said cutter means, and wherein said truck means comprises a truck having wheels that ride on said first and second segmented rails and a body that straddles said first and second segmented rails and overlies said free space therebetween.

15. In the combination of claim 14, wherein said coupling means comprises gimbal means for connecting said truck to said cutter means so as to uniformly distribute a downward force on said truck to said plurality of truck wheels that ride on said first and second segmented rails.

16. In the combination of claim 14, further comprising first and second spaced parallel shafts arranged parallel to and on the outboard sides of said first and second segmented rails respectively, and being supported at their ends so as to span said workpiece support surface, first and second sleeve means respectively mounted on said first and second shafts for coaxial rotation relative thereto, and a first set of transversely oriented support arms connected between said first sleeve means and said first segmented rail and the first set of segmented rollers, and a second set of transversely oriented support arms connected between said second sleeve means and said second segmented rail and the second set of segmented rollers, said first and second sleeve means and said first and second sets of support arms coacting to allow said first and second segmented rails and first and second sets of segmented rollers to pivot in limited arcs about said first and second shafts respectively toward and away from said workpiece support surface in a direction generally normal to said support surface.

17. In the combination of claim 16, wherein said first and second sleeve means are transversely segmented to form sleeve segments that are in registration with said rail and roller segments.

* * * * *